United States Patent
Fluhrer et al.

(10) Patent No.: US 7,748,034 B2
(45) Date of Patent: Jun. 29, 2010

(54) STRONG ANTI-REPLAY PROTECTION FOR IP TRAFFIC SENT POINT TO POINT OR MULTI-CAST TO LARGE GROUPS

(75) Inventors: Scott Roy Fluhrer, Sunnyvale, CA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1027 days.

(21) Appl. No.: 11/249,898

(22) Filed: Oct. 12, 2005

(65) Prior Publication Data

US 2007/0083923 A1    Apr. 12, 2007

(51) Int. Cl.
G06F 12/14 (2006.01)
G06F 12/16 (2006.01)
G06F 7/04 (2006.01)
H04L 9/32 (2006.01)

(52) U.S. Cl. .................. 726/12; 726/4; 726/22; 726/23; 713/168; 713/171; 713/176

(58) Field of Classification Search ............ None
See application file for complete search history.

(56) References Cited

U.S. PATENT DOCUMENTS

| | | | |
|---|---|---|---|
| 6,851,054 B2 * | 2/2005 | Wheeler et al. | 713/176 |
| 7,139,916 B2 * | 11/2006 | Billingsley et al. | 713/182 |
| 7,313,816 B2 * | 12/2007 | Sinha et al. | 726/10 |
| 7,370,211 B2 * | 5/2008 | Rindborg et al. | 713/191 |
| 2002/0170053 A1 * | 11/2002 | Peterka et al. | 725/31 |
| 2003/0067921 A1 | 4/2003 | Sivalingham | |
| 2004/0066935 A1 | 4/2004 | Marino | |
| 2004/0205332 A1 | 10/2004 | Bouchard et al. | |
| 2004/0215753 A1 * | 10/2004 | Chan et al. | 709/223 |
| 2010/0023762 A1 * | 1/2010 | Kailash et al. | 713/168 |

OTHER PUBLICATIONS

The Internet Society, "MIKEY: Multimedia Internet KEYing", "Replay Handling and Timestamp Usage" (Section 5.4), Copyright © The Internet Society (2004), 62 pages.

* cited by examiner

Primary Examiner—Kaveh Abrishamkar
(74) Attorney, Agent, or Firm—Trellis IP Law Group, PC

(57) ABSTRACT

A mechanism for providing strong anti-replay protection at a security gateway in a network for protection against an attacker duplicating encrypted packets. The mechanism assigns a unique sequence number to each encrypted packet and a time stamp. A receiving security gateway rejects packets that have a duplicative sequence number or that is too old to protect itself against replay attacks. Each security gateway checks off the sequence numbers as they are received knowing that the sending security gateway assigns sequence numbers in an increasing order. The receiving security gateway remembers the value of the highest sequence number that it has already seen as well as up to N additional sequence numbers. Any packet with a duplicative sequence number is discarded. In addition to the sequence number, each packet also has an associated time stamp that corresponds to an epoch during which it should be received. If the packet is received after the epoch has expired, the packet is rejected.

20 Claims, 4 Drawing Sheets

STRONG ANTI-REPLAY PROTECTION FOR IP TRAFFIC SENT POINT TO POINT OR MULTI-CAST TO LARGE GROUPS

BACKGROUND OF THE INVENTION

1. Field of Invention

The present invention broadly relates to preventing replay of duplicative packets in a secure network. More specifically, embodiments of the present invention relate to a system and method for detecting and preventing replay of duplicated packets in IP traffic that is sent point to point or multicast to large groups.

2. Description of the Background Art

In a secure enterprise level network, for example, there are usually several security gateways that are responsible for protecting network traffic as it traverses the network. While many schemes may be employed, one protection scheme to secure the network using IPsec to encrypt the traffic before it is transmitted over the network. In this scheme, all gateways within a security group share a common set of encryption keys, and so a sending security gateway may use those keys to encrypt the traffic. A receiving security gateway can then use its available key to decrypt the packets and forward them on to the destination, without regards as to which security gateway was the sending security gateway. As long as each gateway belongs to the same security group, the necessary key for decrypting the traffic upon receipt will be available to enable the gateway to decrypt the traffic before sending it on. IPsec is often used to secure large networks to ensure that the traffic is authentic, that the packet traffic is confidential and that the network traffic has not been modified in transit.

While the integrity of the traffic is protected by encryption for IPsec traffic, there is, simply put, no methodical process for strongly protecting a large group from an attack designed to intercept valid packets as they are sent across the network and then subsequently flood the network with a replay of such packets. When this happens, each receiving security gateway must expend significant resources decrypting stale packets that are in reality no longer valid. Often times, the resources needed to respond to the stale packets can be significant thereby preventing the security gateway from handling legitimate traffic thereby effectively resulting in a denial of service for legitimate traffic.

In the event the receiving security gateway does not detect that stale packets are being replayed, an attacker can use this property to cause stale data to be accepted as if it were fresh data. If the information in the packet is timely, such a replay could be disastrous. To illustrate, if the packet contains stock ticker information, an old stock quote should never be accepted as if it were the current quote. Clearly, if the stale information was accepted, investors could be misled into reacting in ways that are profitable to the attacker. Thus, it is necessary that security gateways ensure that a receiver accept a valid packet from a sender no more than once.

A security gateway that is part of a multicast group with thousands of receivers is a particularly attractive target because the replay of a single stream of replayed multicast packets will affect each of the receiving security gateways. Each member of the receiving group must maintain a separate anti-replay state for each sender and can amount to a substantial amount of gateway resources. IPsec protocols ESP (RFC 2406) and AH (RFC 2402) make provision for anti-replay through the use of sequence numbers. This per-sender state approach is simply not scaleable because the number of stored state grows linearly with the number of senders in the group. Further, the amount of state will never decrease because once a packet is seen from a particular sender, the state for that sender will not be deleted before the IPsec Security Association (SA) expires.

Other attempts to prevent anti-replay scale employ time based anti-replay techniques but such techniques provide a very 'loose' form of anti-replay protection because pirated packets can be replayed until the time interval expires. Accordingly, a scalable strong anti-replay mechanism is necessary to ensure that a large group of receiving security gateways always detects duplicative packets in a manner that does not expend significant network resources.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
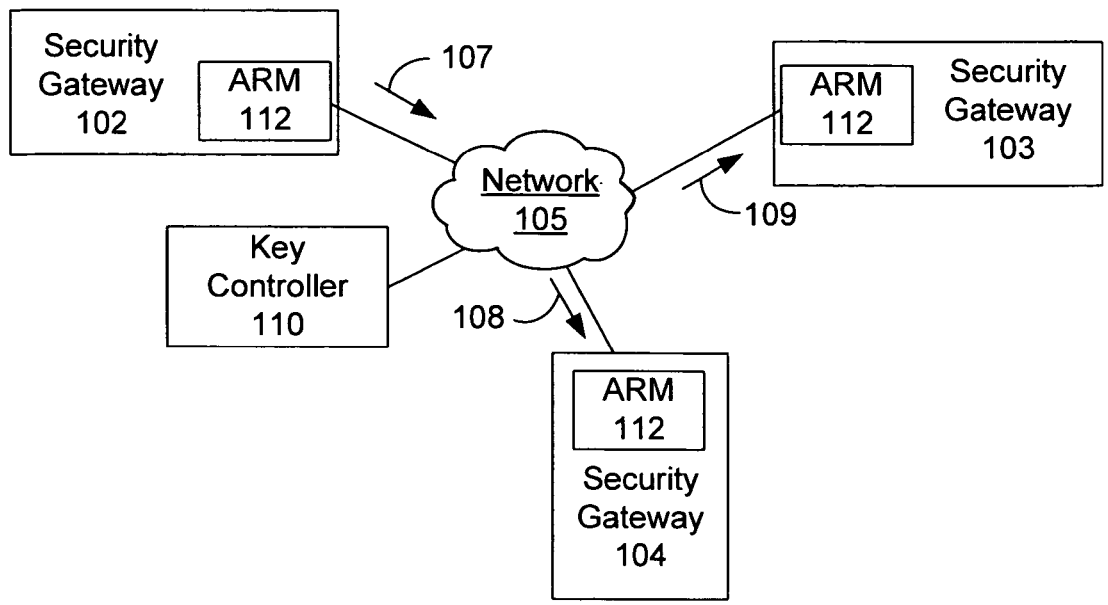
FIG. 1 illustrates a plurality of security gateways in an enterprise network in accordance with one embodiment of the present invention.

Referring in detail now to the drawings, there is seen in FIG. 1 a plurality of network devices that implement a data encryption protocol such as IPsec protocol to protect packet traffic. In one embodiment, the network devices may comprise a security gateways, such as 102-104 that are deployed in an enterprise network 105. Although only three security gateways are illustrated, it will be appreciated that network 105 may comprise hundreds if not thousands of such network devices. In other embodiments, the network devices may be deployed on other types of packet based network such as the Internet where it is critical to protect packets. Security gateways are typically tasked with ensuring the privacy and the integrity of the information contained in the packet. Central to this task is the need to ensure that stale packets are not replayed. Thus, security gateways need to be capable of being able to prevent the replay of packets. The anti-replay capability is deployed at each security gateway or at other network devices tasked with protecting the packet traffic.

In operation, packet traffic is sent point to point from one security gateway, such as security gateway 102 to, for example, security gateway 104. This point-to-point transmission is indicated by reference arrows 107 and 108. In other instances, security gateway 102 may multi-cast packet traffic to many security gateways such as indicated by the additional reference arrow 109. A key controller 110 is used to establish the IPsec Security Association (SA) between peers. Key controller 110 enables the peers to agree on authentication methods, encryption methods and the decryption keys and algorithms to use and the lifetime of the keys. This information is stored in the SA. When packets are multi-cast, it is to be understood that the packets may be sent from a single security gateway to literally tens of thousands of receiving security gateways. Each security gateway includes an anti-replay mechanism 112 (abbreviated as ARM 112 in the figure) for providing adds anti-replay protection.

Anti-replay protection ensures that a man-in-the-middle attack cannot capture legitimate network traffic and then replay the traffic at a later time in a denial of service attack or to trick the ultimate destination for the information into acting on stale data. Anti-replay protection ensures that legitimate packets are not replicated and replayed. Thus, even though a security gateway function is to receive and decrypt encrypted packets before forwarding them on to the ultimate destination, the present invention prevents a second or subsequent copy of a legitimate packet from being decrypted and forwarded.

Figure 2:
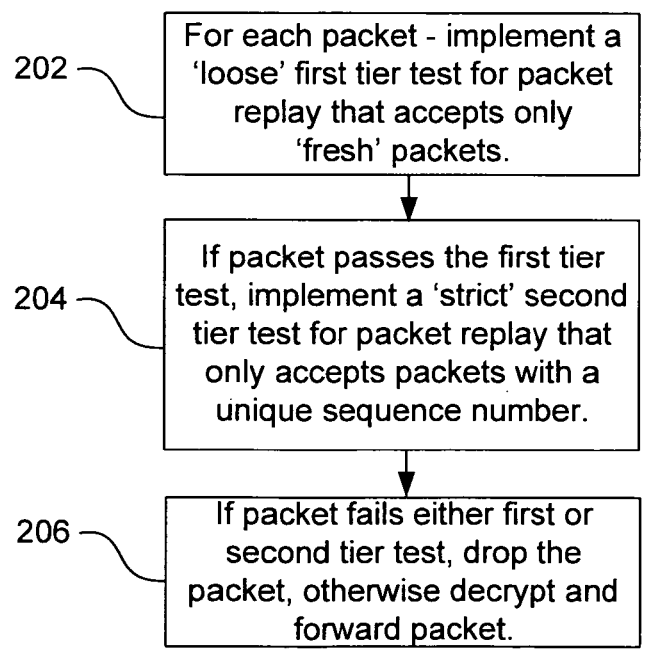
FIG. 2 is a flow diagram of one embodiment of the present invention.

Anti-replay protection ensures that security gateways receiving the packets are not confused by the receipt of the duplicative packets and accidentally forwarded on. In accordance with an embodiment of the present invention, a two-tiered anti-replay system is implemented at each security gateway as illustrated in FIG. 2. The first tier implements a loose anti-replay test as indicated at step 202 to eliminate any stale packets. If a packet passes the first test, the second tier implements a much stricter anti-replay test as indicated at step 204. The second tier test determines if a packet sequence number is duplicative of any other packet received during a defined epoch or time interval that is know to both the sender and the receiver. As long as the packet is both not stale and not been previously received, the receiver will accept the packet. Since the anti-replay mechanism is preferably associated with security gateways on a secure network, the packet is then decrypted and forwarded to a destination device.

Figure 3:
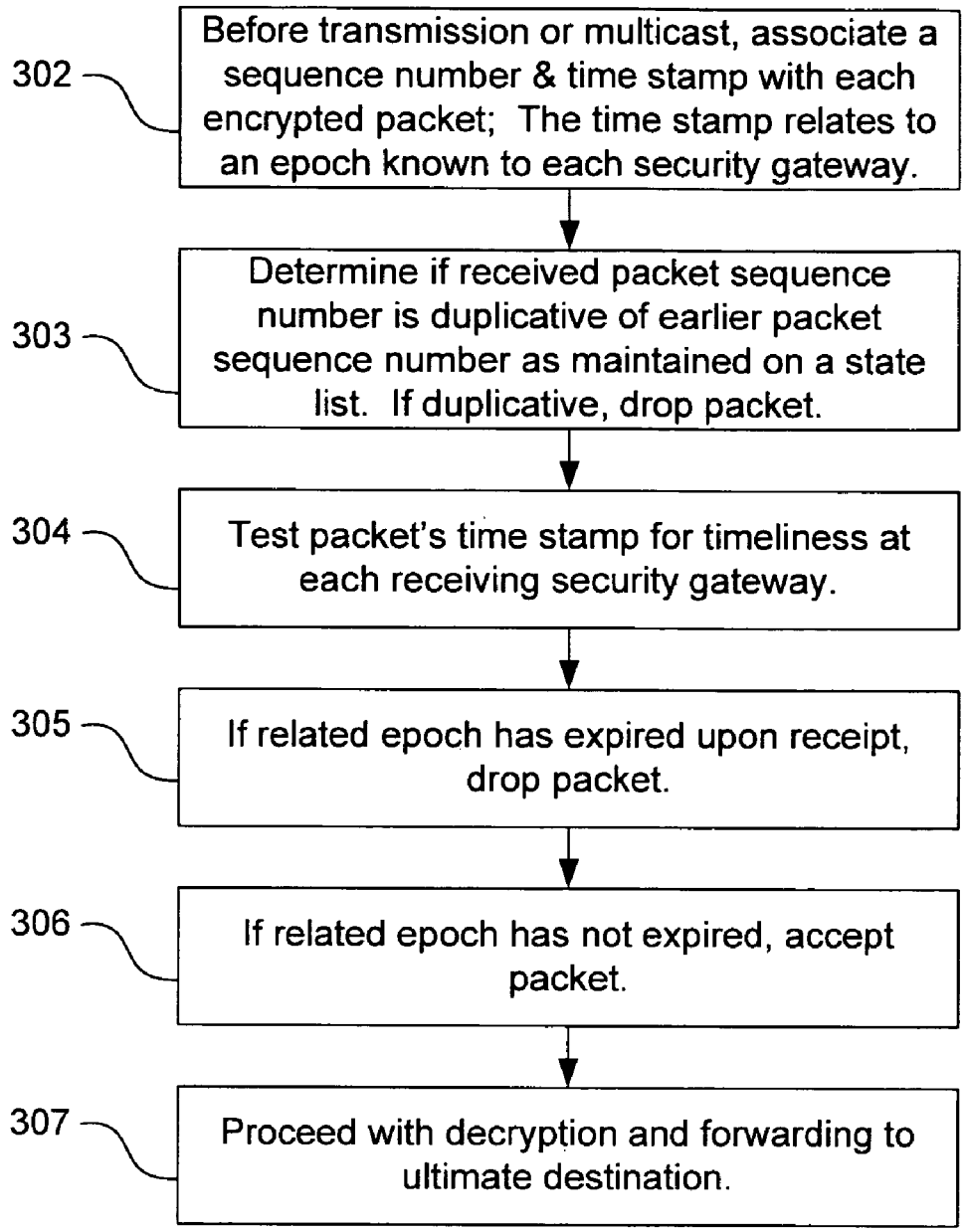
FIG. 3 is a more detained flow diagram in accordance with one embodiment of the present invention.

FIG. 3 illustrates, in more detail, an embodiment of the two tier test shown in FIG. 2. More specifically, network devices that have established an IPsec SA between them exchange packet traffic that is encrypted before transmission and decrypted upon receipt. A sequence number and a time stamp are associated with each packet by the transmitting security gateway as indicated at 302. Typically, the sequence number and time stamp are included in the packet header. At the receiving peers, the security gateways each maintain a state list of each packet received from the sender. As each packet is received, it's sequence number is compared to the sequence numbers associated with previously received packets as indicated at 303. If the sequence number is duplicative with an already received sequence number, the packet is dropped.

To illustrate, if security gateway 102 is the transmitting security gateway or sender, it applies a sequence number to each packet sent to the receiving security gateways. Upon receipt of the packet, each security gateway in the receiving group checks a state list to determine if a packet with the same sequence number has been previously received. If it has not, the packet is further processed and that packet's sequence number is added to the state list. If the packet is duplicative of an earlier received packet, the later arriving packet is dropped. This means that the packet is not forwarded on by the receiving security gateway.

Even if the sequence number of the packet is not included on the state list, which would indicate that the sequence number is not duplicative, the packet may still be dropped if it fails the second tier test as indicated at 304. Specifically, if the packet is a stale packet arrives outside of an epoch defined window, then the packet is deemed to be too old and it is also rejected by each receiving security gateway as indicated at 305. The epoch limits the number of sequence numbers that must be maintained in the state list because if a packet arrives after the epoch as expired, the packet is deemed to be stale. This allows the receiver to discard elements from the state list which correspond to epochs which have already expired. Limiting the number of sequence numbers means that the anti-replay mechanism 112 will efficiently scale to large groups of network devices. The epoch effectively implements a sliding window for identifying valid packets. With this scheme, stale packets, that is, too old, are dropped but if the epoch has not yet expired, then the packet is accepted as indicated at 306 but note that even if the packet is fresh, it may be dropped if duplicative of another packet that was received during the epoch. Thereafter, as indicated at 207, the security gateway may decrypt the packet payload and forward on to the ultimate destination, which may be a server, IP telephone or other network device where the receipt of ordered packets are necessary or desirable.

This system efficiently scales for networks comprises large numbers of security gateways or other network devices that implement the IPsec protocol. Advantageously, scalability is improved because each security gateway no longer does not have to maintain a state list of the sequence numbers for the duration of the IPsec SA. Clearly, for networks that have a large number of security gateways or other network devices, the resources required to maintain the state list of sequence numbers for each of the other security gateways are more efficiently implemented. Security gateway memorizes the sequence number from each of the other security gateways. Complicating the memorizing task is the fact that security gateways can come and go, security gateways can reboot from time to time or may be assigned new IP addresses. The two tier test minimizes memory requirements for maintaining the state lists, the time to look up packet sequence numbers on the state list and the amount of data required to implement the anti replay mechanism.

Figure 4:
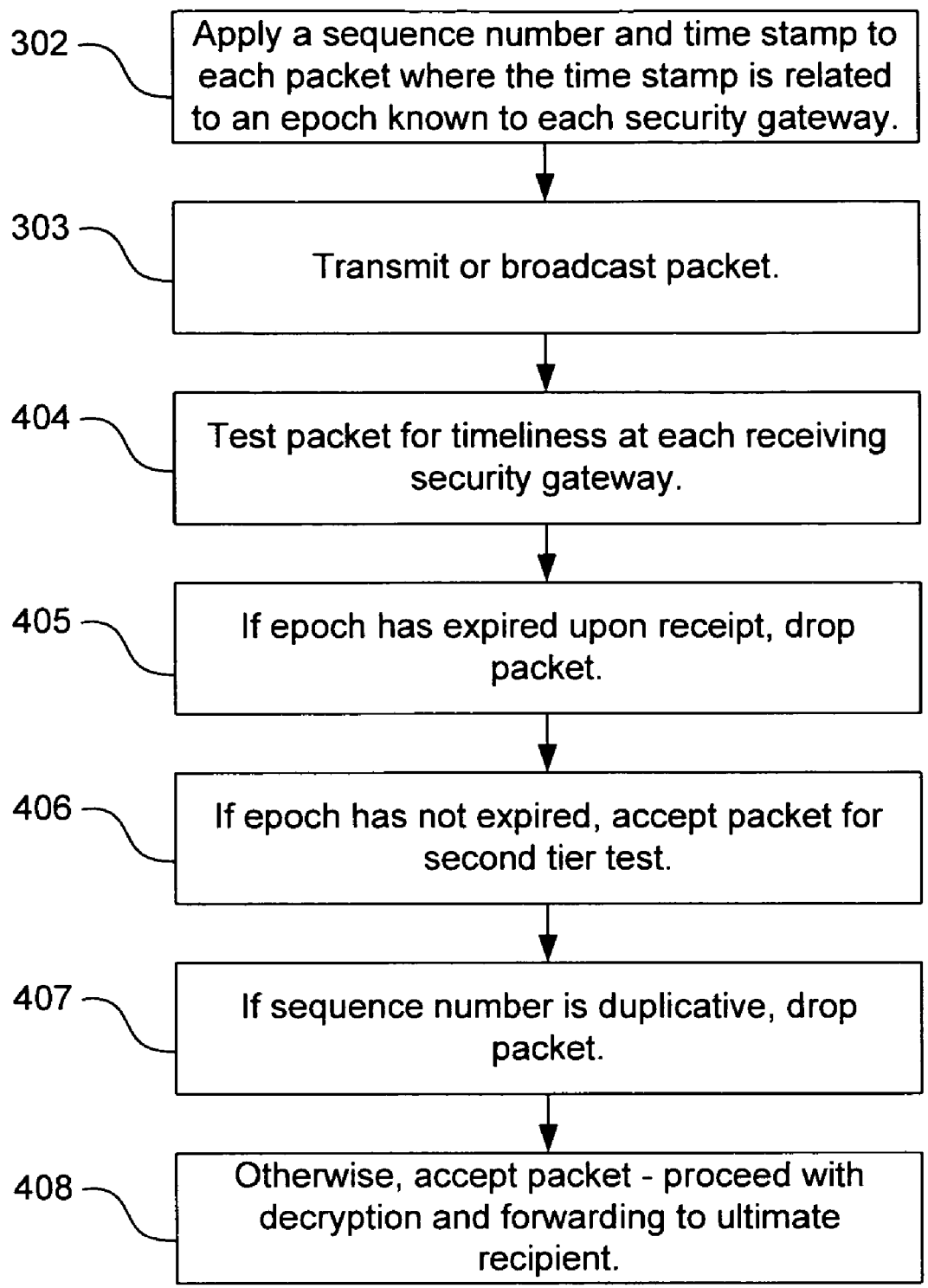
FIG. 4 is another flow diagram in accordance with one embodiment of the present invention.

FIG. 4 illustrates another embodiment of the present invention where operation of the two tier anti-replay mechanism is illustrated. As indicated at steps 302 and 303, each packet receives both a sequence number or other sequence identifier and a time stamp indicating the transmission time. These items are applied by the sending security gateway and then transmitted. When the packet is received at the receiving gateway it is tested to determine if it is a fresh or stale packet as indicated at 404. More specifically, the time stamp is recovered from the packet and the send time is compared to the receive time. If the packet is too old, it is dropped by the receiving security gateway as indicated at 405. If the packet is received within a selected time interval, the packet is accepted as indicated at 406. The packet is then tested, as indicated at 407, to determine if the sequence number associated with the packet is a duplicative with another sequence number. If it is duplicative, it is dropped. If, however, it is a new timely received packet, it is accepted, as indicated at 407. It is then decrypted and forwarded to the ultimate destination. It will be recognized that this first tier of anti-replay protection, when implemented on its own, provides a very loose anti-replay protection because an attacker could replay packets until the time limit expires. However, when combined, the two tier of anti-replay protection results in a very strict acceptance criteria applied in a manner that scales to a network where senders may multicast to thousands or tens of thousands of security gateways. Thus, this two tier anti-replay mechanism provides a level of protection that is quite strong for IP traffic. Advantageously, this two tier anti-replay mechanism uses minimal resources even for multi-casts to large groups of security gateways and accordingly provides a strong highly scaleable, secure anti-replay mechanism.

Figure 5:
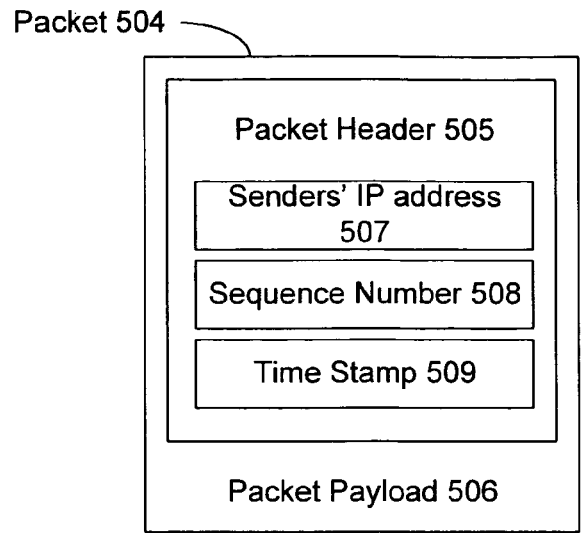
FIG. 5 illustrates a packet configuration in accordance with one embodiment of the present invention.
Figure 6:
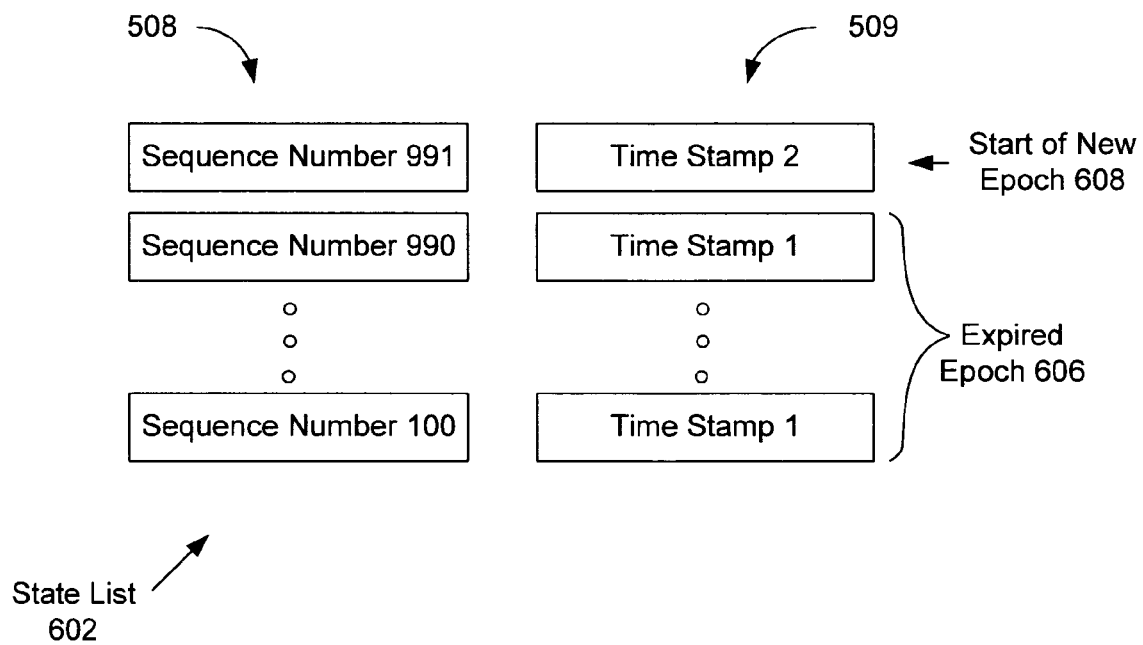
FIG. 6 illustrates a state list maintained at a receiving security gateway for each sender in accordance with one embodiment of the present invention.

FIGS. 5 and 6 illustrate one configuration of a packet and the state list, respectively. Specifically, packet 504 comprises a packet header 505 and a packet payload 506. Typically, payload 506 is encrypted and intended for a network device other than the security gateway that receives the packet from the sender. Upon receipt, the packet payload 506 is decrypted and forwarded on to the destination network device. The packet header 505 includes the sender's IP address 507 as specified in the IPsec SA, the sequence number 508 for this packet that is part of a stream of packet traffic received from the identified sender and the time stamp 509 which indicates the time when the packet was sent.

Each receiving security gateway maintains state list 602 for each sender. As packets are received, the sequence numbers 508 are stored in state list 602 but only for the duration of the current epoch. The state list comprises the most recent valid sequence number in addition to the most recent N previous valid sequence numbers. A sliding "window" of size N describes the N most recent sequence numbers seen, where the most recent sequence number in the most recent one in the window. This window can be implemented as a bitmask for memory savings. To summarize, the processing rules are:

1. Any packet with a sequence number prior to the oldest sequence number in the window is so old that it is presumed to be a replay;
2. Any packet with a sequence number falling within the window can be immediately judged a replay or not, depending on if the bit representing that sequence number is already set;
3. Any packet with a sequence number newer than the most recent sequence number must be further processed to determine of it is a valid packet. In the event that it is a valid packet, the sequence number in the packet becomes the most recent one in the window.

Thus the window scheme summarizes all of the packets seen to date for a particular sender. If the sequence number is 32 bits long and the window is 32 bits long, then only 64 bits are needed to implement the state list per sender, which is quite modest. The window scheme for implementing the state list is well adapted for applications with hundreds of senders because it only tracks or maintains a window for "current" senders. Using the epoch time-based method, the present invention only tracks senders from the current epoch rather than every sender that ever sent a packet thereby further reducing the amount of state that must be stored.

As illustrated in FIG. 6, a plurality of sequence numbers 508 ranging from sequence number 100 to sequence number 990 were received during epoch 606. Upon receipt of sequence number 991, a new time stamp (time stamp 2) is detected which indicates the start of a new epoch. At this time, all sequence numbers associated with the now expired epoch 606 are purged from the state list. If a packet such as the packet with sequence number 100 is received during epoch 608, it will be rejected because it is a stale packet even though sequence number 100 is no longer maintained in the state list. If a duplicative packet having the sequence number 991 is received during epoch 608, it will be rejected as duplicative of an earlier received packet. In some instances, it may be desirable to allow some packets from the previous epoch to be accepted by the receiving security gateway if the sequence number is close to the first sequence number of the new epoch. To illustrate, in state list 602, the sequence number 990 has been received but sequence number 989 was not received. In a typical implementation, packets associated with the most recently expired epoch 660 may be accepted if within a sliding window where the window has a depth of a selected depth, such as n sequence numbers where n may be 64, 128 or some other integer number. Thus, the receiving security gateways need only keep as active entries in its list for that sender the sequence numbers that are received within the current epoch. This enables the depth of the sliding window to be set more efficiently. In one embodiment, the sequence number is a 32-bit number and the epoch may be set to between a clock tick to about two seconds with longer epochs selected only if dictated by network loading. In the preferred embodiment, the epoch is one clock tick or about ten milliseconds. It is also to be understood that the sequence number may have any length and the epoch interval may be selected to be any time interval.

Essentially, the strong anti replay mechanism is based on the fact that the receiving security gateway is receiving a stream of packets from a trusted source, the stream of packets are synchronized at the start of the transmission so the sequential receipt of packets is known, and the epoch are known. This mechanism minimizes the memory required to maintain the sequence number list for each peer. Similarly, the time to look up packet sequence numbers on the state list is also minimized. The two tier mechanism minimizes the amount of data required to implement strong anti replay protection. It is to be understood that the order in which the two tiers of anti-replay protection are checked may vary from application to application.

In yet other embodiments, as each epoch expires, cleaning up the state list occurs on each clock tick the packet sequence numbers at the oldest packets in the window. Since each packet contains a time stamp, it is a simple manner to clean up the list by removing sequence numbers that correspond to the expired time interval. For each peer or security gateway, the window contains the sequence number of the packets during the current epoch and the latest time stamp. When a packet arrives with a new time stamp, the current epoch has expired and all but the last sequence number is purged from the list. Thus, the depth of the window can be significantly minimized. The epoch can change on each clock tick, typically about once every 10 milliseconds. In many applications, the number of packets received during a typical epoch can number in the thousands. Clearly, if there are thousands of peers that are acting as a sender, this limited window depth provides a significant savings in resources that must be allocated to the receiving security gateway.

Thus by practice of various embodiments of the present invention there is provided a two tiers of a strong anti-replay protection mechanism that provides a level of protection for IP traffic that is sent point to point in a network or that is multi-cast to large groups of security gateways. This mechanism can be implemented on layer 3 or other layers. Further, this mechanism can be implemented to ensure the integrity of VOIP packets or other messages transmitted over a network. Because the two tier anti-replay mechanism uses minimal resources it is highly scaleable for networks having large numbers of security gateways such as occurs in secure IP multi-cast applications or Dynamic Group Virtual Private Network (DGVPN) solutions.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any directional arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   maintaining a list of sequence numbers in a state list at a security gateway, wherein a first set of the sequence numbers corresponds to packets having a first time stamp that is associated with a first epoch window, and wherein a second set of the sequence numbers corresponds to packets having a second time stamp associated with a second epoch window;
   removing the first set of sequence numbers from the state list when the first epoch window expires, wherein the first epoch window expires when a packet having the second time stamp arrives at the security gateway;
   receiving, at the security gateway, a plurality of packets from a peer security gateway, wherein each packet has an associated sequence number and a time stamp;
   performing a first tier check on a packet, wherein the packet is valid according to the first tier check if the packet includes a time stamp associated with the second epoch window;
   performing a second tier check on the packet, wherein the packet is valid according to the second tier check if the packet includes a sequence number that is not listed in the state list;
   accepting the packet if both the first tier check and the second tier check indicate that the packet is valid; and
   rejecting the packet if either the first tier check or the second tier check does not indicate that the packet is valid.

2. The method of claim 1 further comprising determining if the time stamp associated with each packet is received within the second epoch.

3. The method of claim 2 further comprising determining if the sequence number associated with each packet is duplicative of another packet already received.

4. The method of claim 2 further comprising maintaining a bit map to indicate whether the plurality of packets were received in the second epoch.

5. The method of claim 4 wherein said bit map comprises about 64 bits where each bit is set when the sequence number associated with a packet is detected.

6. The method of claim 1 further comprising
   maintaining during each epoch, a per-sender multiple sequence counter to identify duplicative packets.

7. The method of claim 1 further comprising providing the method as a billable service.

8. The method of claim 1 wherein the plurality of packets is multi-cast from a transmitting security gateway to a plurality of receiving security gateways.

9. The method of claim 1 wherein the plurality of packets is sent over a group virtual private network.

10. The method of claim 1 wherein the plurality of packets comprise group traffic secured by a network security policy.

11. The method of claim 1 wherein the plurality of packets comprise voice over IP traffic.

12. An apparatus comprising:
    one or more processors; and
    logic encoded in one or more computer readable media for execution by the one or more processors and when executed operable to:
    maintain a list of sequence numbers in a state list at a security gateway, wherein a first set of the sequence numbers corresponds to packets having a first time stamp that is associated with a first epoch window, and wherein a second set of the sequence numbers corresponds to packets having a second time stamp associated with a second epoch window;
    remove the first set of sequence numbers from the state list when the first epoch window expires, wherein the first epoch window expires when a packet having the second time stamp arrives at the security gateway;
    receive, at the security gateway, a plurality of packets from a peer security gateway, wherein each packet has an associated sequence number and a time stamp;
    perform a first tier check on a packet, wherein the packet is valid according to the first tier check if the packet includes a time stamp associated with the second epoch window;

perform a second tier check on the packet, wherein the packet is valid according to the second tier check if the packet includes a sequence number that is not listed in the state list;

accept the packet if both the first tier check and the second tier check indicate that the packet is valid; and reject the packet if either the first tier check or the second tier check does not indicate that the packet is valid.

13. The apparatus of claim 12 wherein the logic when executed is further operable to determine if the time stamp associated with each packet is received within the second epoch.

14. The apparatus of claim 13 wherein the logic when executed is further operable to determine if the sequence number associated with each packet is duplicative of another packet already received.

15. The apparatus of claim 14 wherein the logic when executed is further operable to maintain a bit map to indicate whether the plurality of packets were received in the second epoch.

16. The apparatus of claim 15 wherein said bit map comprises about 64 bits where each bit is set when the sequence number associated with a packet is detected.

17. The apparatus of claim 12 wherein the plurality of packets is multi-cast from a transmitting security gateway to a plurality of receiving security gateways.

18. The apparatus of claim 12 wherein the logic when executed is further operable to maintain, during each epoch, a per-sender multiple sequence counter to identify duplicative packets.

19. The apparatus of claim 12 wherein the logic when executed is further operable to implement the apparatus in a billable service.

20. The apparatus of claim 12 wherein the plurality of packets is multi-cast from a transmitting security gateway to a plurality of receiving security gateways.

* * * * *